US011624474B2

(12) United States Patent
Jalbert et al.

(10) Patent No.: US 11,624,474 B2
(45) Date of Patent: *Apr. 11, 2023

(54) INVERTIBLE STRUCTURE WITH A TRACK

(71) Applicant: BALSAM INTERNATIONAL UNLIMITED COMPANY, Dublin (IE)

(72) Inventors: David Jalbert, Coventry, RI (US); David Simonelli, Coventry, RI (US)

(73) Assignee: BALSAM INTERNATIONAL UNLIMITED COMPANY, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,779

(22) Filed: Aug. 16, 2021

(65) Prior Publication Data

US 2021/0372558 A1 Dec. 2, 2021

Related U.S. Application Data

(63) Continuation of application No. 16/027,098, filed on Jul. 3, 2018, now Pat. No. 11,092,277, which is a
(Continued)

(51) Int. Cl.
*F16M 11/04* (2006.01)
*F16M 11/10* (2006.01)
(Continued)

(52) U.S. Cl.
CPC ........... *F16M 11/105* (2013.01); *A41G 1/007* (2013.01); *F16M 11/045* (2013.01);
(Continued)

(58) Field of Classification Search
CPC .... F16M 11/04; F16M 11/045; F16M 11/046; F16M 11/10; F16M 11/22; F16M 11/38; F16M 11/42; A41G 1/007; A47G 33/06
See application file for complete search history.

(56) References Cited

U.S. PATENT DOCUMENTS 126,367 A    4/1872  Ziegler
1,599,083 A  9/1926  Jean
(Continued)

FOREIGN PATENT DOCUMENTS

CN    2356598    1/2000
CN    2528331    1/2003
(Continued)

OTHER PUBLICATIONS

"City Living Flatline Clothesline Installation Video Guide—Install City Living Clothes Line," YouTube video (Jan. 22, 2013), available at https://www.youtube.com/watch?v=pxns-KAsG2w; download Jun. 2016.
(Continued)

*Primary Examiner* — Tan Le
(74) *Attorney, Agent, or Firm* — Tarolli, Sundheim, Covell & Tummino LLP

(57) ABSTRACT

The disclosed invertible structures rely on combinations of translational movements to effect inversion. An exemplary invertible structure includes a track operable to be slidably coupled to a connector element of a longitudinal structure. In an embodiment, the connector element may include at least two connectors at least partially disposed in a slot defined in the track, which may have a plurality of translational axes for translational movements of the connectors of the longitudinal structure that would effect the inversion of the longitudinal structure.

20 Claims, 12 Drawing Sheets

Related U.S. Application Data continuation of application No. 15/220,328, filed on Jul. 26, 2016, now Pat. No. 10,030,808, which is a continuation of application No. PCT/US2015/013156, filed on Jan. 27, 2015, which is a continuation-in-part of application No. 14/553,984, filed on Nov. 25, 2014, now Pat. No. 9,581,287.

(60) Provisional application No. 62/030,602, filed on Jul. 29, 2014, provisional application No. 61/932,240, filed on Jan. 27, 2014.

(51) Int. Cl.
    *A41G 1/00*      (2006.01)
    *F16M 11/22*      (2006.01)
    *F16M 11/42*      (2006.01)
    *F16M 11/38*      (2006.01)
    *F21V 21/26*      (2006.01)

(52) U.S. Cl.
CPC ........... *F16M 11/046* (2013.01); *F16M 11/22* (2013.01); *F16M 11/38* (2013.01); *F16M 11/42* (2013.01); *A41G 1/00* (2013.01); *F21V 21/26* (2013.01)

(56) References Cited

U.S. PATENT DOCUMENTS

| | | | |
|---|---|---|---|
| 1,603,307 A * | 10/1926 | Anderson | B23K 37/0461 248/185.1 |
| 2,988,837 A | 6/1961 | Hutton | |
| 3,408,032 A | 10/1968 | Francis | |
| 3,507,042 A | 4/1970 | Hana | |
| 3,632,076 A | 1/1972 | Rogers, Jr. | |
| 3,643,935 A | 2/1972 | Bell | |
| 3,900,637 A | 8/1975 | Byrd et al. | |
| 3,970,834 A | 7/1976 | Smith | |
| 4,054,696 A | 10/1977 | Crownover | |
| 4,072,857 A | 2/1978 | Devicaris | |
| 4,093,758 A | 6/1978 | Weskamp et al. | |
| 4,095,778 A | 6/1978 | Wing | |
| 4,144,364 A | 3/1979 | Tice | |
| 4,451,510 A | 5/1984 | Boisvert et al. | |
| 4,606,366 A | 8/1986 | Collet | |
| 4,659,597 A | 4/1987 | Lau | |
| 4,847,123 A | 7/1989 | Armstead et al. | |
| 5,464,178 A | 11/1995 | Grinwald et al. | |
| 5,490,599 A | 2/1996 | Tohidi | |
| 5,771,613 A * | 6/1998 | Geils | D05C 1/02 108/150 |
| 5,820,248 A | 10/1998 | Ferguson | |
| 5,915,742 A | 6/1999 | Hung | |
| 6,099,920 A | 8/2000 | Kao | |
| 6,152,156 A | 11/2000 | Tung | |
| 6,212,800 B1 * | 4/2001 | Bagley | D05C 1/02 38/102.2 |
| 6,394,634 B2 | 5/2002 | Kitchin | |
| 6,458,435 B1 | 10/2002 | Lai | |
| 7,232,596 B2 | 6/2007 | Lai | |
| 7,445,824 B2 | 11/2008 | Leung et al. | |
| 7,493,909 B2 | 2/2009 | Ma | |
| 7,717,375 B2 | 5/2010 | Chen | |
| 8,062,718 B2 | 11/2011 | Schooley | |
| 8,993,077 B2 | 3/2015 | Schooley | |
| 9,040,130 B2 | 5/2015 | Schooley | |
| 9,068,602 B2 | 6/2015 | Hoe et al. | |
| 9,581,287 B2 | 2/2017 | Jalbert et al. | |
| 10,030,808 B2 | 7/2018 | Jalbert et al. | |
| 11,092,277 B2 * | 8/2021 | Jalbert | F16M 11/045 |
| 2004/0111935 A1 | 6/2004 | Tipay | |
| 2005/0249892 A1 | 11/2005 | Rocheleau | |
| 2008/0283717 A1 | 11/2008 | Kim et al. | |
| 2009/0071285 A1 | 3/2009 | Lauderbaugh | |
| 2013/0175840 A1 | 7/2013 | Nadav | |
| 2015/0211674 A1 | 7/2015 | Jalbert et al. | |

FOREIGN PATENT DOCUMENTS

| | | | |
|---|---|---|---|
| GB | 2292681 A * | 3/1996 | .............. D05C 1/02 |
| WO | 2013081616 | 6/2013 | |

OTHER PUBLICATIONS

Defendants' Invalidity Contentions served in Civil Action No. 15-cv-04829-WHO in the United States District Court for the Northern District of California, San Francisco Division (redacted) dated Mar. 8, 2016.
PCT/SU2015/013156 International Search Report and Written Opinion dated Jun. 30, 2015.

* cited by examiner

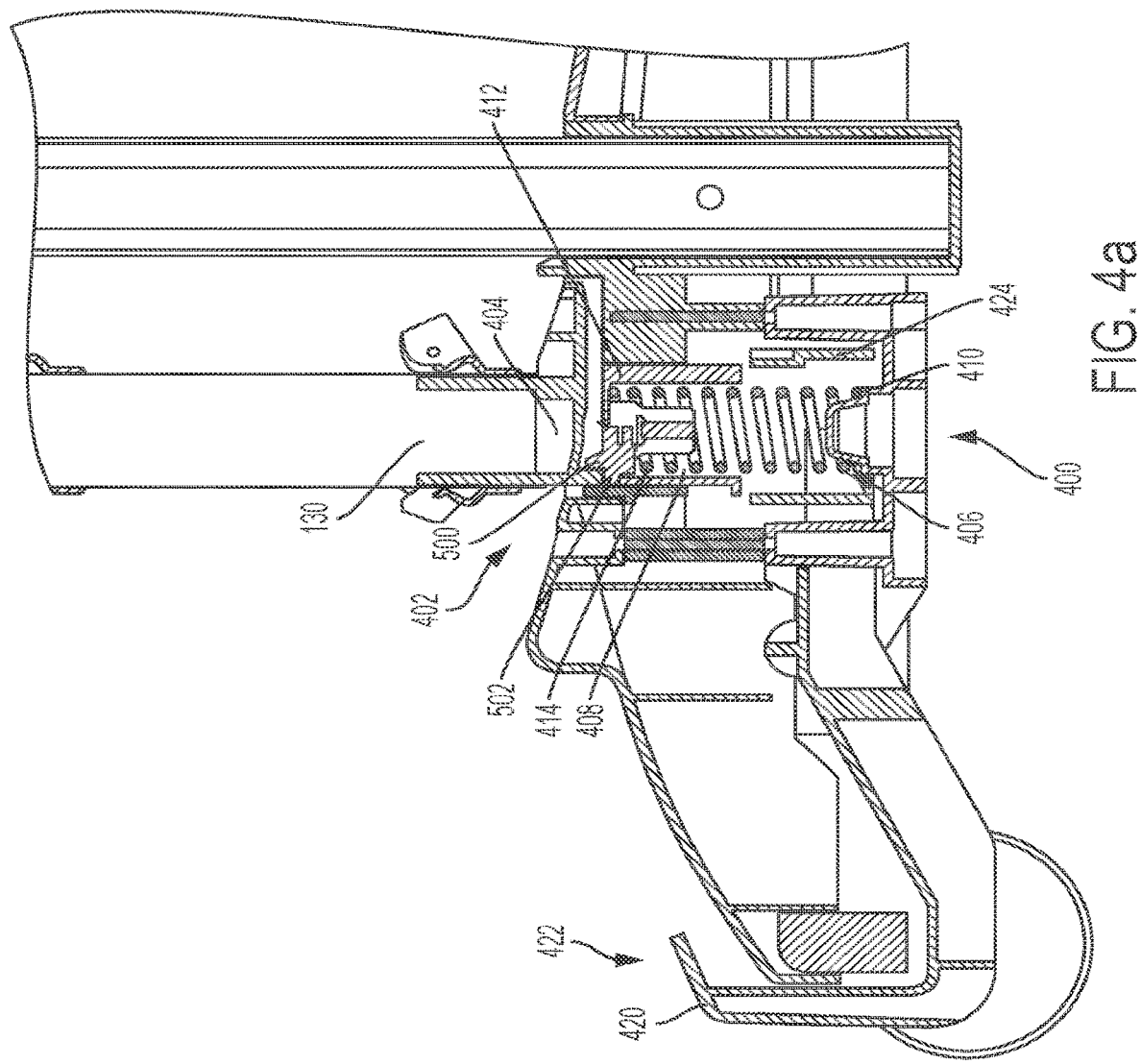

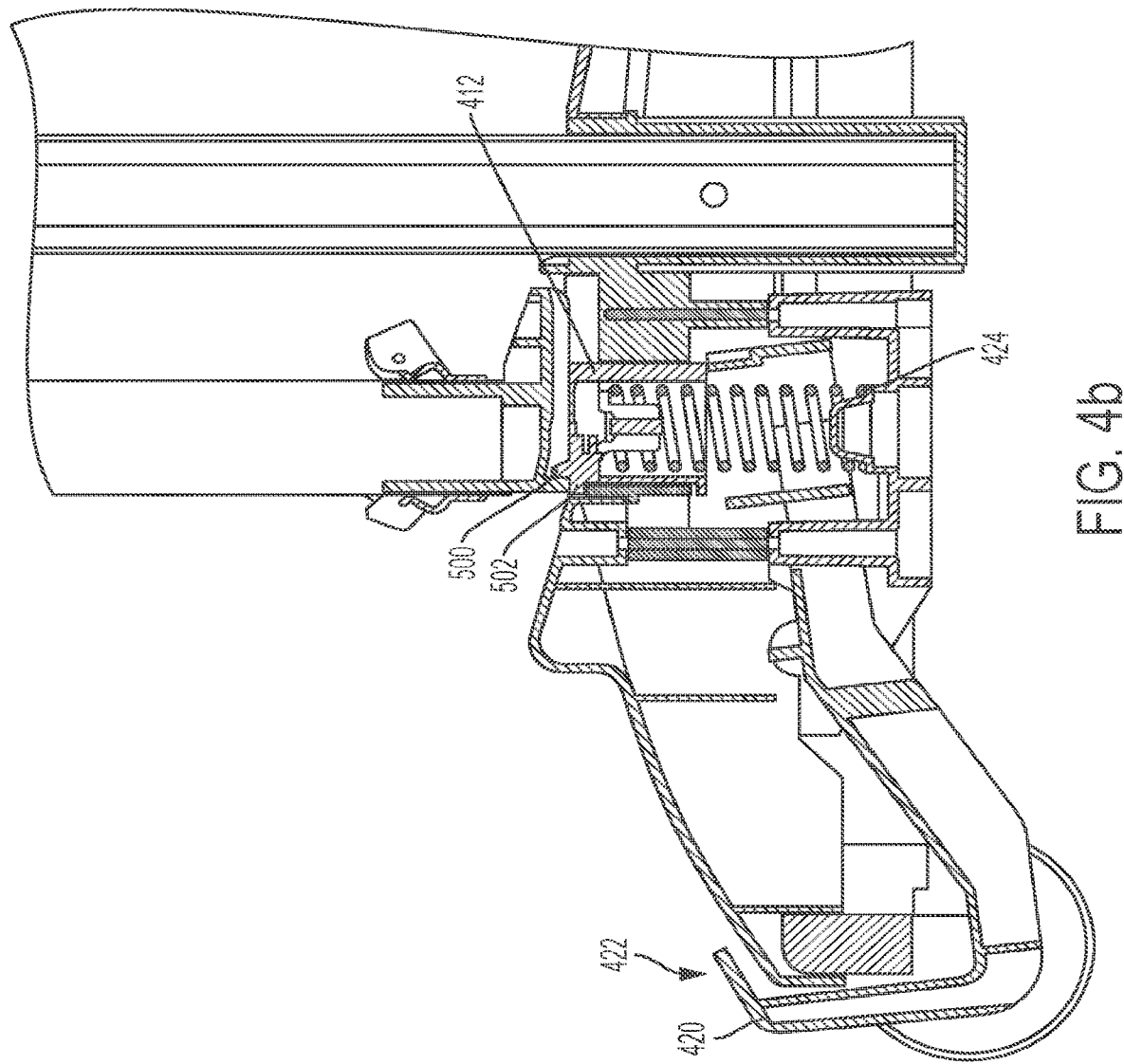

INVERTIBLE STRUCTURE WITH A TRACK

TECHNICAL FIELD

This disclosure generally relates to invertible structure, and more particularly to invertible structure achieving inversion through translational movements.

BACKGROUND

Invertible structures have many applications, such artificial trees. Artificial trees may be configured to have collapsible branches that branch out when the artificial tree is in an upright position and collapse when the artificial tree is in an inverted position for easily storage.

SUMMARY

An embodiment of an invertible structure of the present disclosure may include a stand, a support portion connected to the stand and extending upwardly from the stand, a track connected to the support portion, and a longitudinal portion comprising a plurality of support structures operable to receive attachments, and a connector element for engaging the track. The connector element of the longitudinal portion is operable to move along the track such that the longitudinal portion is re-orientated from a substantially upright orientation to a substantially inverted orientation or from a substantially inverted orientation to a substantially upright orientation.

Another embodiment of an invertible structure of the present disclosure may include a stand, a support portion connected to the stand and extending upwardly from the stand, a track connected to the first longitudinal portion and a longitudinal portion comprising a plurality of support structures operable to receive an attachment; and a connector element for engaging the track. The connector element of the longitudinal portion is operable to move along the track such that the longitudinal portion is re-orientated from a substantially upright orientation to a substantially inverted orientation or from a substantially inverted orientation to a substantially upright orientation. Also, when the longitudinal portion is in the substantially upright position, an end portion of the longitudinal portion is received in the stand.

An embodiment of a track operable to be slidably coupled to at least two connectors of a longitudinal structure may include a body and a slot defined in the body and a spring device connected to the body. The slot may have a plurality of translational axes, including a first translation axis defined by a first portion of the slot. A first end coil portion of the spring device is fixed to body and a second end coil portion of the spring device is operable to exert a force, either directly or indirectly, on the longitudinal structure, and wherein the force is in a direction substantially along the first translational axis.

BRIEF DESCRIPTION OF THE DRAWINGS

FIG. 1b is a schematic diagram showing a focused view of the invertible structure of FIG. 1a;

FIGS. 4a-4b are cross-sectional view of an exemplary embodiment of the stand of the invertible structure in FIG. 1;

FIG. 6 is a cross-sectional view of an exemplary and longitudinal portion of the invertible structure of FIG. 1a.

DETAILED DESCRIPTION

Example embodiments will now be described hereinafter with reference to the accompanying drawings, which form a part hereof, and which illustrate example embodiments which may be practiced. As used in the disclosures and the appended claims, the terms "embodiment" "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Figure 1A:
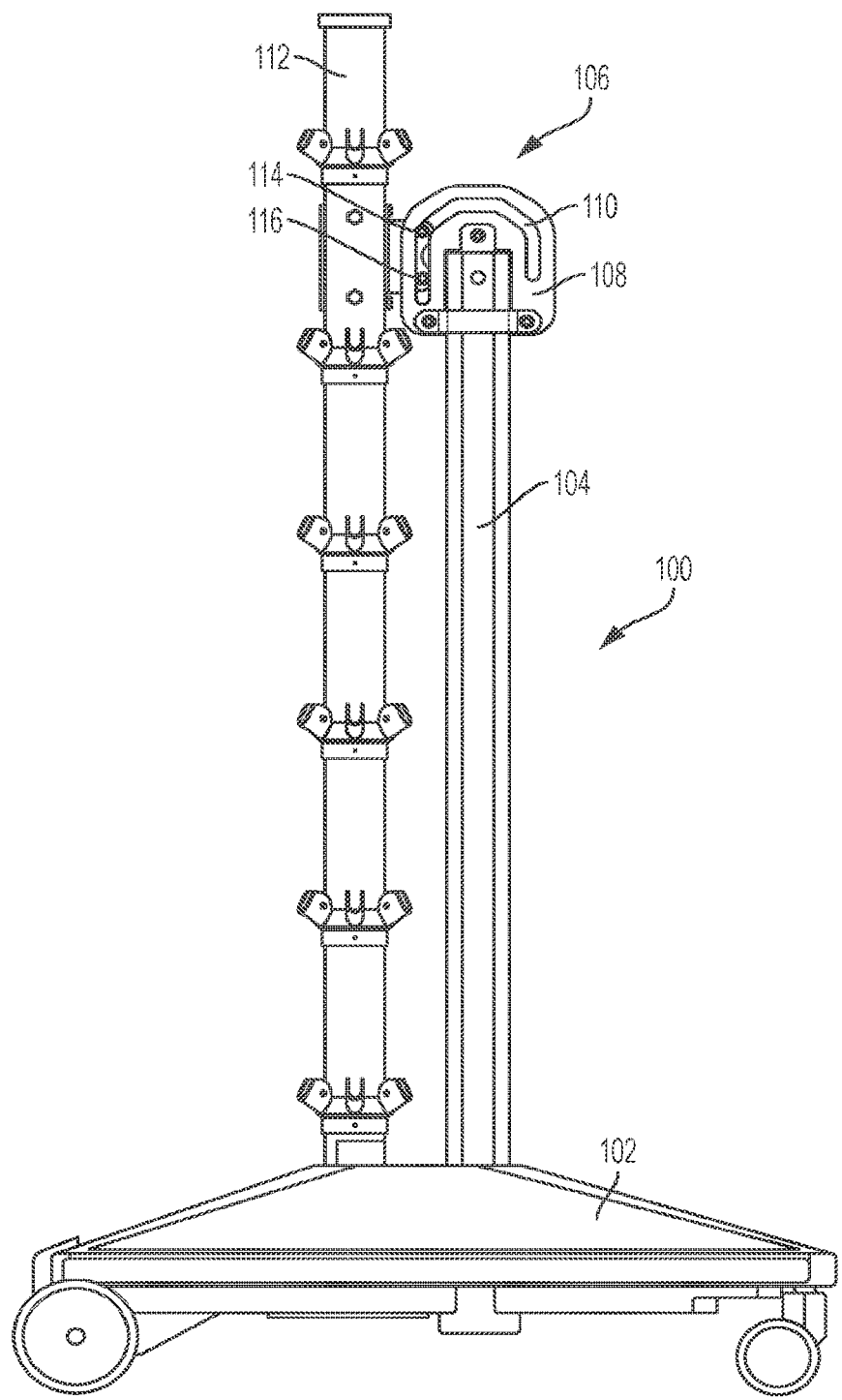
FIG. 1a is a schematic diagram illustrating an exemplary embodiment of an invertible structure in a first orientation, in accordance with the present disclosure.

FIG. 1a is a schematic diagram illustrating an exemplary embodiment of an invertible structure 100. The invertible structure 100 includes a stand 102, a support portion 104 connected to the stand 102, a track 106 connected to the support portion 104. The support portion 102 may be fixably connected to the stand 102 and extend upward therefrom to form a vertical support structure. It is to be appreciated that one of ordinary skill in the art may implement the principles disclosed in the present application with a variety of suitable configuration for the track 106. In an exemplary The track 106 may include a body 108 and a slot 110 defined therein. The slot 110 may have a plurality of translational axes (not shown). The invertible structure 100 may further include a longitudinal portion 112 comprising at least two connectors 114 and 116. The at least two connectors 114 and 116 may be disposed at least partially in the slot 110 to allow the longitudinal portion 112 to move in a series of translational movements.

In an embodiment, the connectors 114 and 116 of the longitudinal portion 112 are operable to be translated along the translational axes (not shown) of the slot 110 such that the longitudinal portion 112 is re-orientated from a substantially upright orientation to a substantially inverted orientation or from a substantially inverted orientation to a substantially upright orientation. It is to be appreciated that the as the connectors 114 and 116 are translated along the translational axes (not shown) of the slot 110, the longitudinal portion 112 undergoes various combinations of translational movements and repositions itself relative to the support portion 102 as shown in FIG. 1c. As such the combination of translational movements of the longitudinal portion 112 effected by the translations of the connectors 114 and 116 would allow for a substantial inversion of the orientation of the longitudinal portion 112.

Figure 1B:
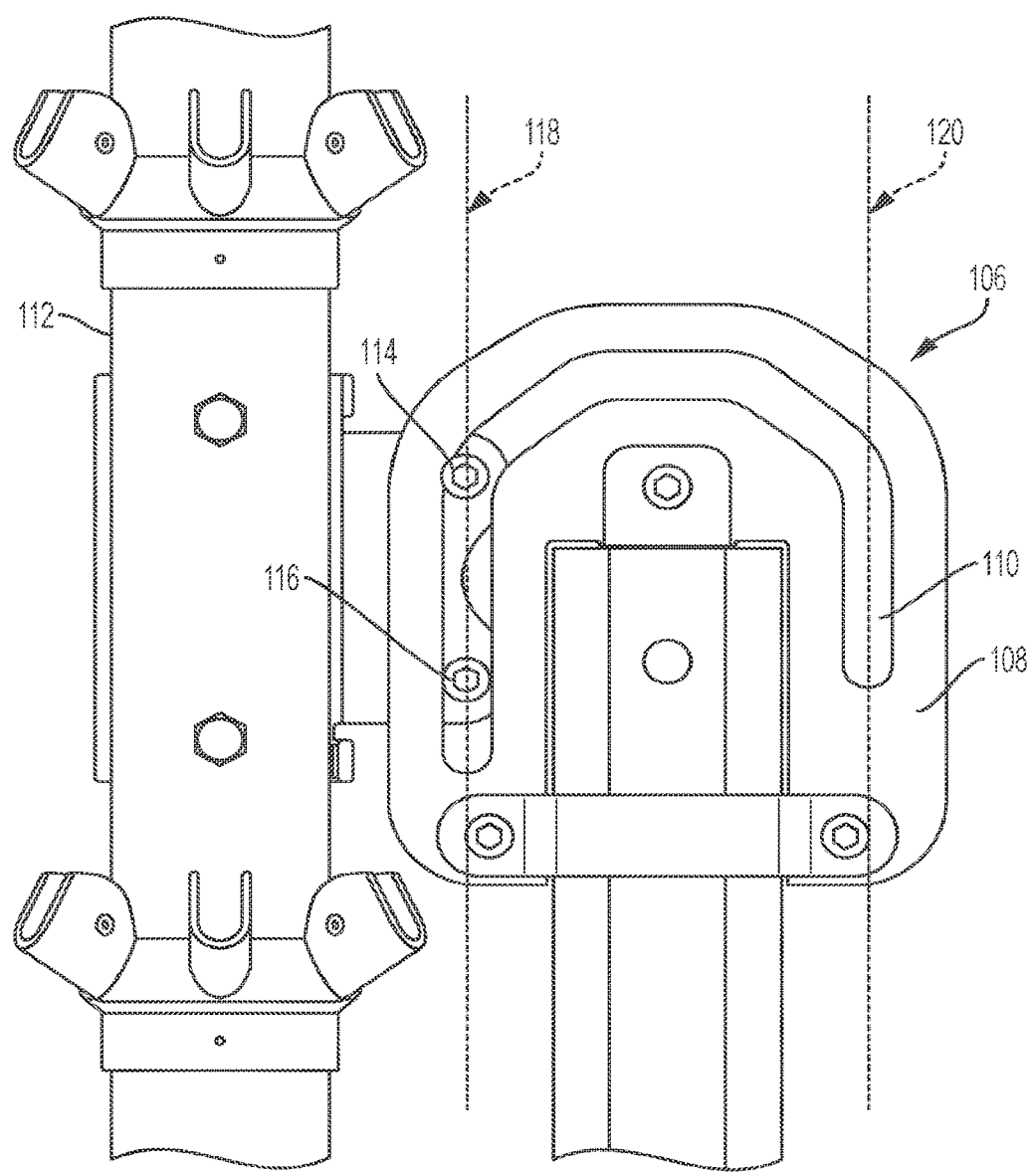
Figure 1C:
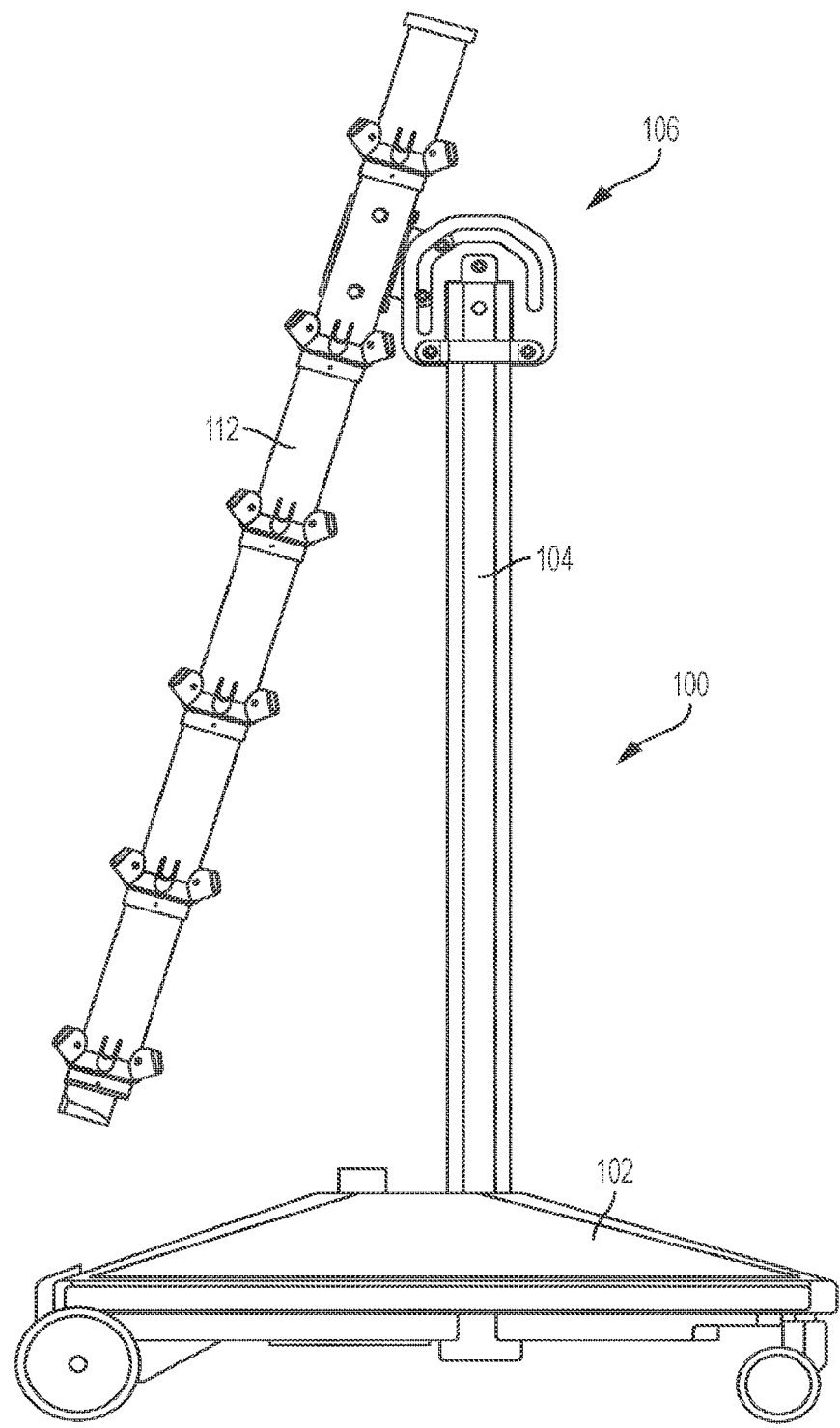
FIG. 1c is a schematic diagram illustrating an exemplary embodiment of the invertible structure of FIG. 1a in a second orientation, in accordance with the present disclosure.

FIG. 1b is a schematic diagram illustrating a focused view of the invertible structure 100 of FIG. 1a. As shown in FIG. 1b, in an embodiment, the slot 110 of the track 106 has a first translational axis 118 defined by a first portion of the slot 110. The connectors 114 and 116 of the longitudinal portion 112 pray be operable to translate along the first translational axis 118 while the longitudinal portion 112 is in a substantially upright orientation as shown in FIG. 1a. In an embodiment, wherein the slot of the track 106 has a second translational axis 120 defined by a second portion of the slot 110. In an embodiment, the first and second translational axes may be substantially parallel as shown in FIG. 1b. The connectors 114 and 116 of the longitudinal portion 112 are operable to substantially align along the second translational axis 120 while the longitudinal portion 112 is in a substantially inverted orientation. As such, the configuration of the slot 110 of the track 106 allows for the inversion of the longitudinal portion 112.

Figure 2A:
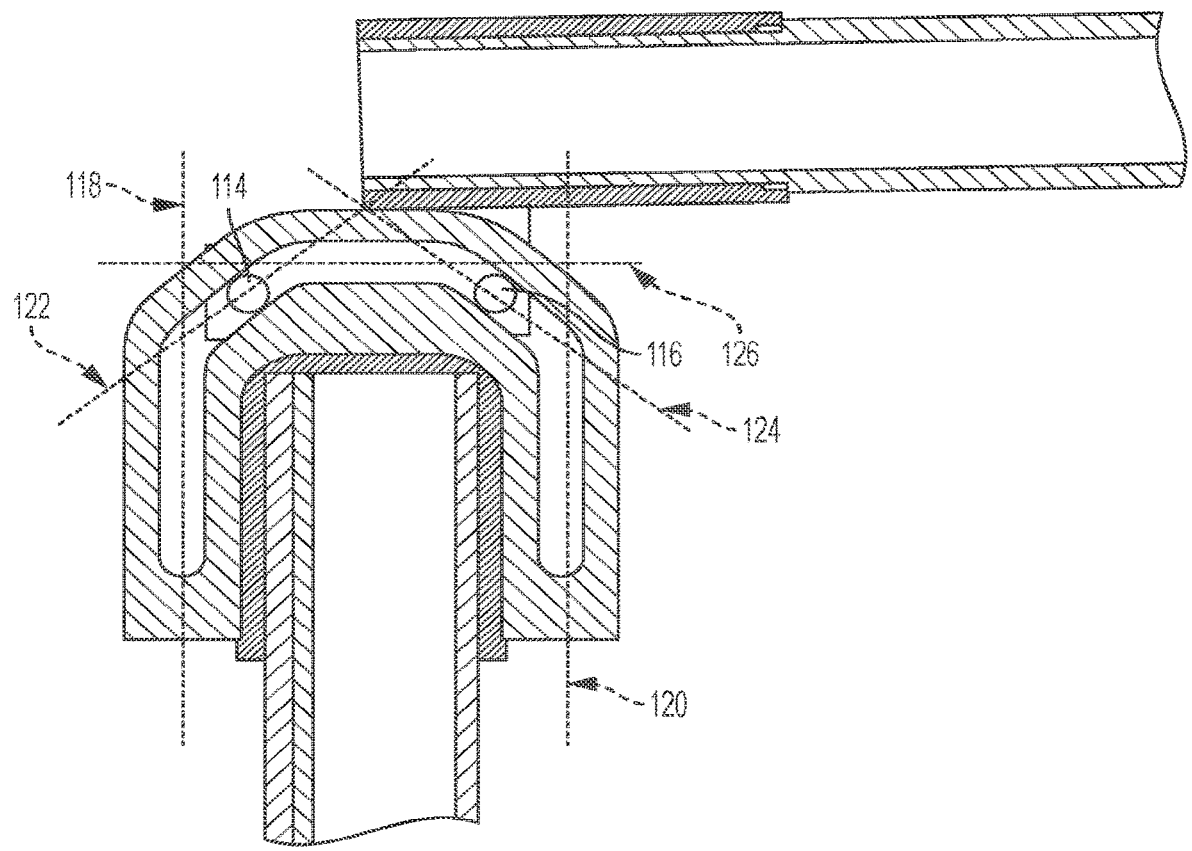
FIG. 2a-2c is are schematic diagrams illustrating exemplary translations of the connectors of the longitudinal portion of the invertible structure of FIGS. 1a-c along the slot of a track of the invertible structure, in accordance with the present disclosure.
Figure 2B:
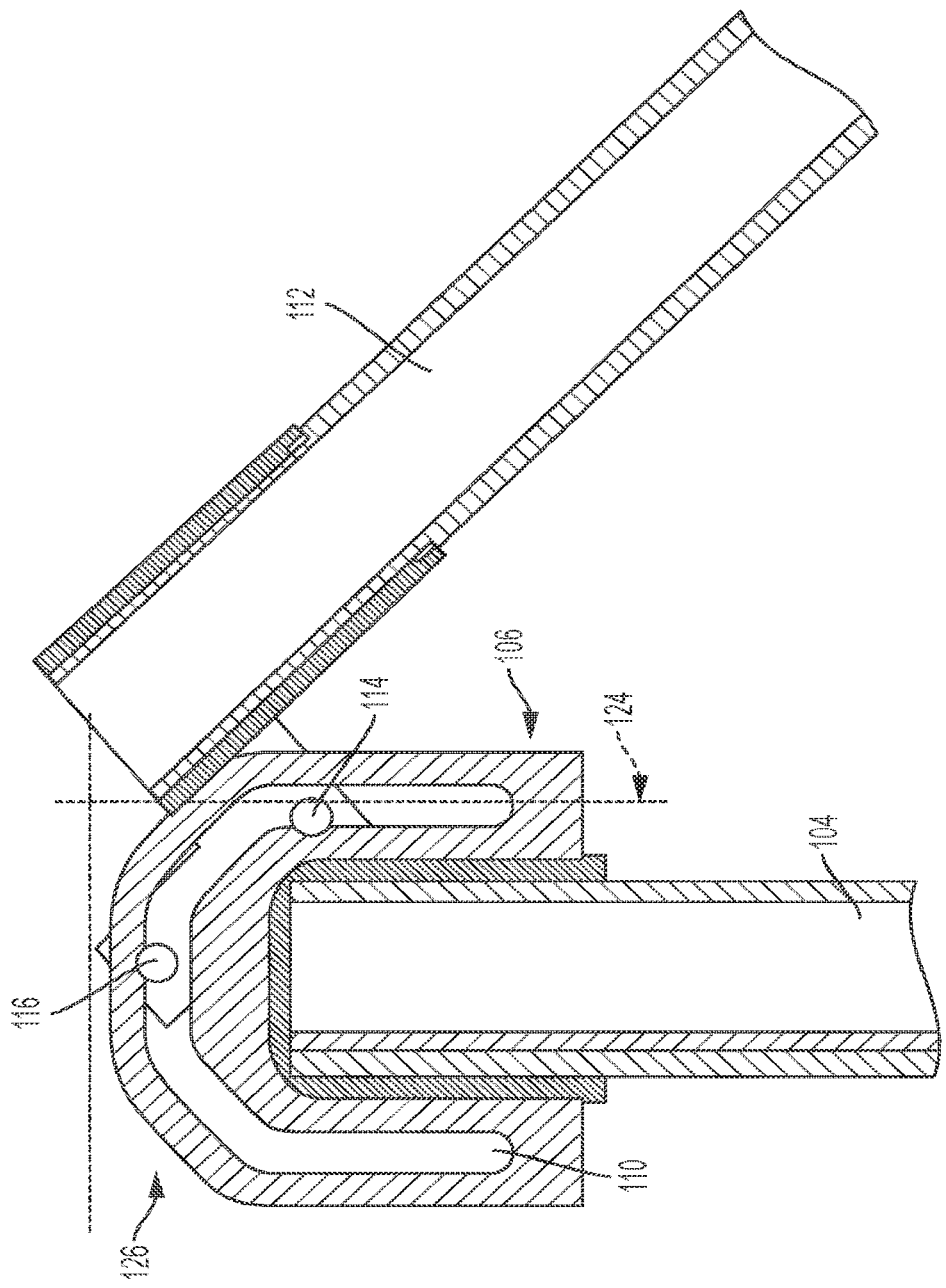
Figure 2C:
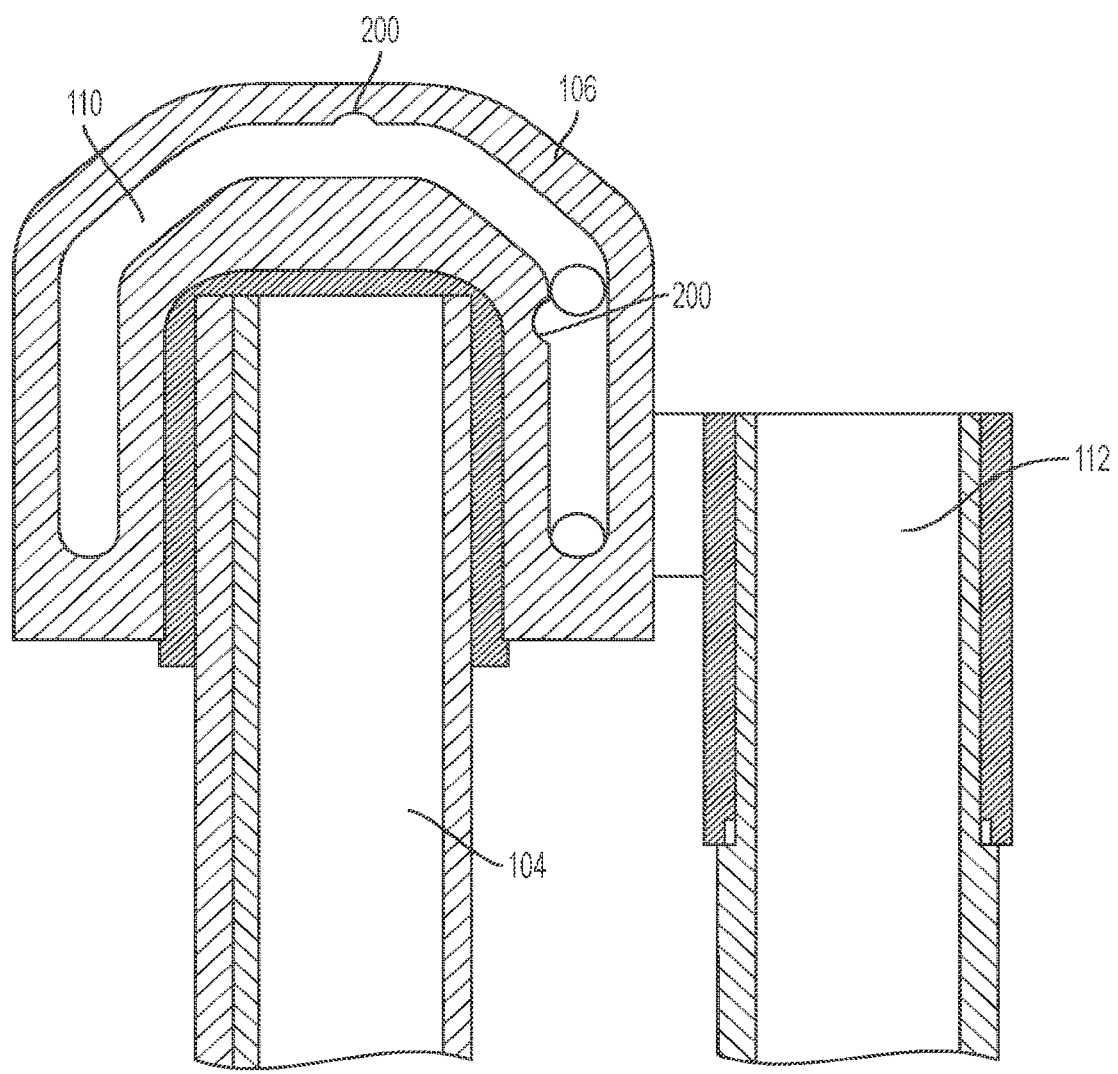

It is to be appreciated that the track 106 may be configured to have different number of translational axes depending on the desired movements and positions of the longitudinal portion 112. FIGS. 2a-2c are schematic diagrams illustrating exemplary translations of the connectors 114 and 116 of the longitudinal portion 112 of the invertible structure 100 of FIGS. 1a-c along the slot 110. In an exemplary embodiment, the slot 110 of the track 106 has third and fourth translational axes 122 and 124 defined by third and fourth portions of the slot 110. The third and fourth translational axes 122 and 124 may be oblique to each other and being oblique to the first and second translational axes 118 and 120 of the slot 110. Configured as such, the connectors 114 and 116 are operable to be translated to portions of the slot 110 where the connectors 114 and 116 may rest on along the third and fourth translational axes 122 and 124 as shown in FIG. 2a. In this resting position in which only there is only gravitation force exerted, the longitudinal portion 112 may be kept at a substantially perpendicular orientation before completing the inversion of the longitudinal portion 112.

In an embodiment, the slot 110 of the track 106, may have a fifth translational axes 126 defined by a fifth portion of the slot 110. The third, fourth, and fifth translational axes 122, 124, and 126 may be oblique to each other, and the fifth translational axis 126 may be substantially perpendicular to the first and second translational axes 118 and 120 of the slot 110. Configured as such, the connectors 114 and 116 are operable to be translated to portions of the slot 110 where the connectors 114 and 116 may rest on along the fourth and fifth translational axes 124 and 126 as shown in FIG. 2b. In this resting position in which only there is only gravitation force exerted, the longitudinal portion 112 may be kept at an oblique orientation before completing the inversion of the longitudinal portion 112 as shown in FIG. 2c. To facilitate various resting positions, such as the one shown in FIG. 2b, the track 106 may include one or more recessed areas 200 along the slot 110 for receiving the connectors 114 and 116. In an embodiment, the slot 110 may form one or more detente as shown in FIG. 2b to allow for better maintenance of the longitudinal portion 112 at the desired orientation. The different orientations between the inversion may allow for better controlled inversion so that the longitudinal portion 112 does not "run away" from a user inverting the longitudinal portion 112. In an embodiment, modifying the positions or lengths of translational axes 122 and 124 relative to that of 126 may allow the longitudinal portion 112 to be maintained at an angle from a substantially perpendicular orientation.

Figure 3A:
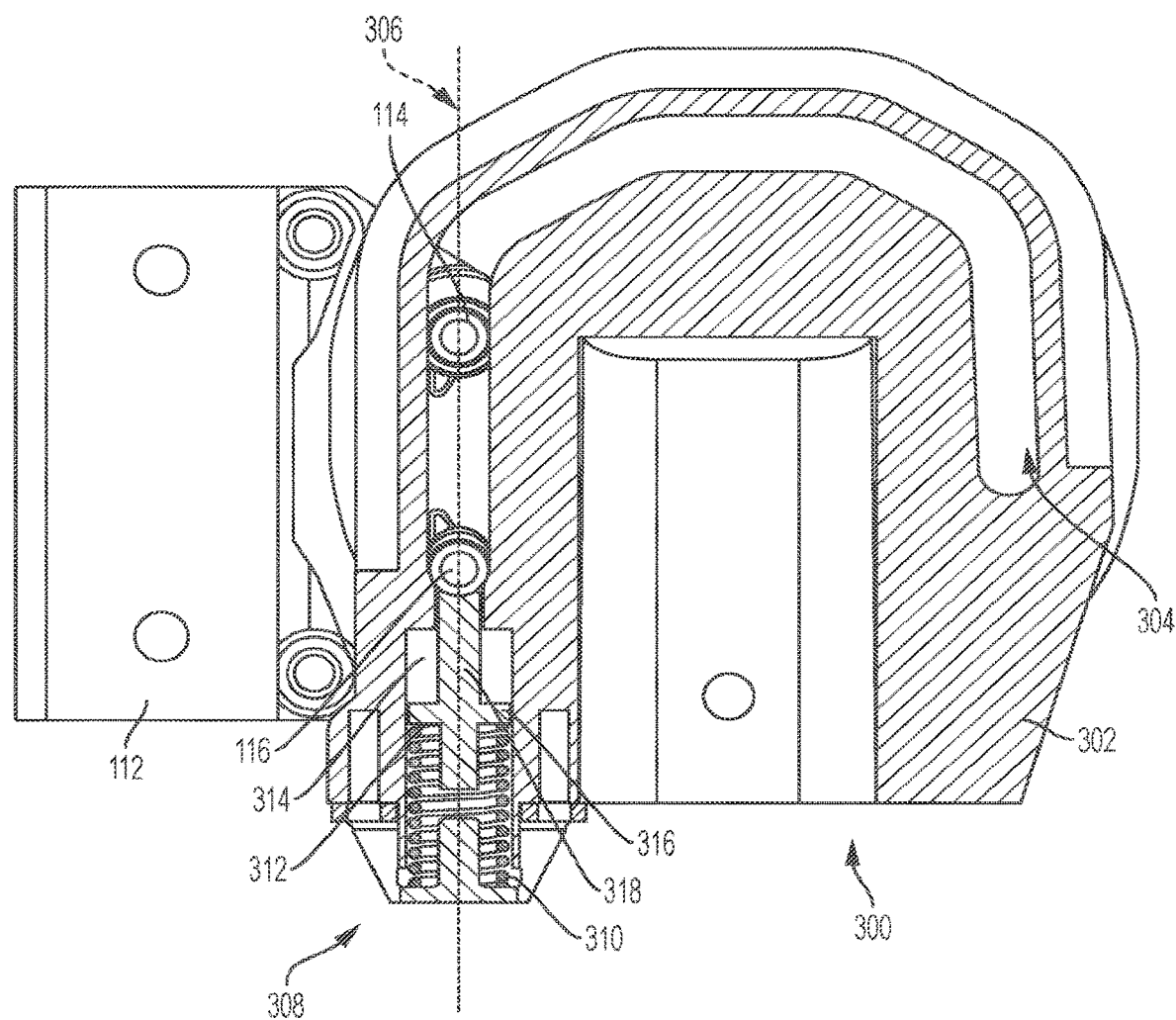
FIG. 3a-3b are schematic diagrams illustrating an exemplary embodiment of a track comprising a spring device operable to exert a translational force on the connectors of the longitudinal portion of an invertible structure, in accordance with the present disclosure.
Figure 3B:
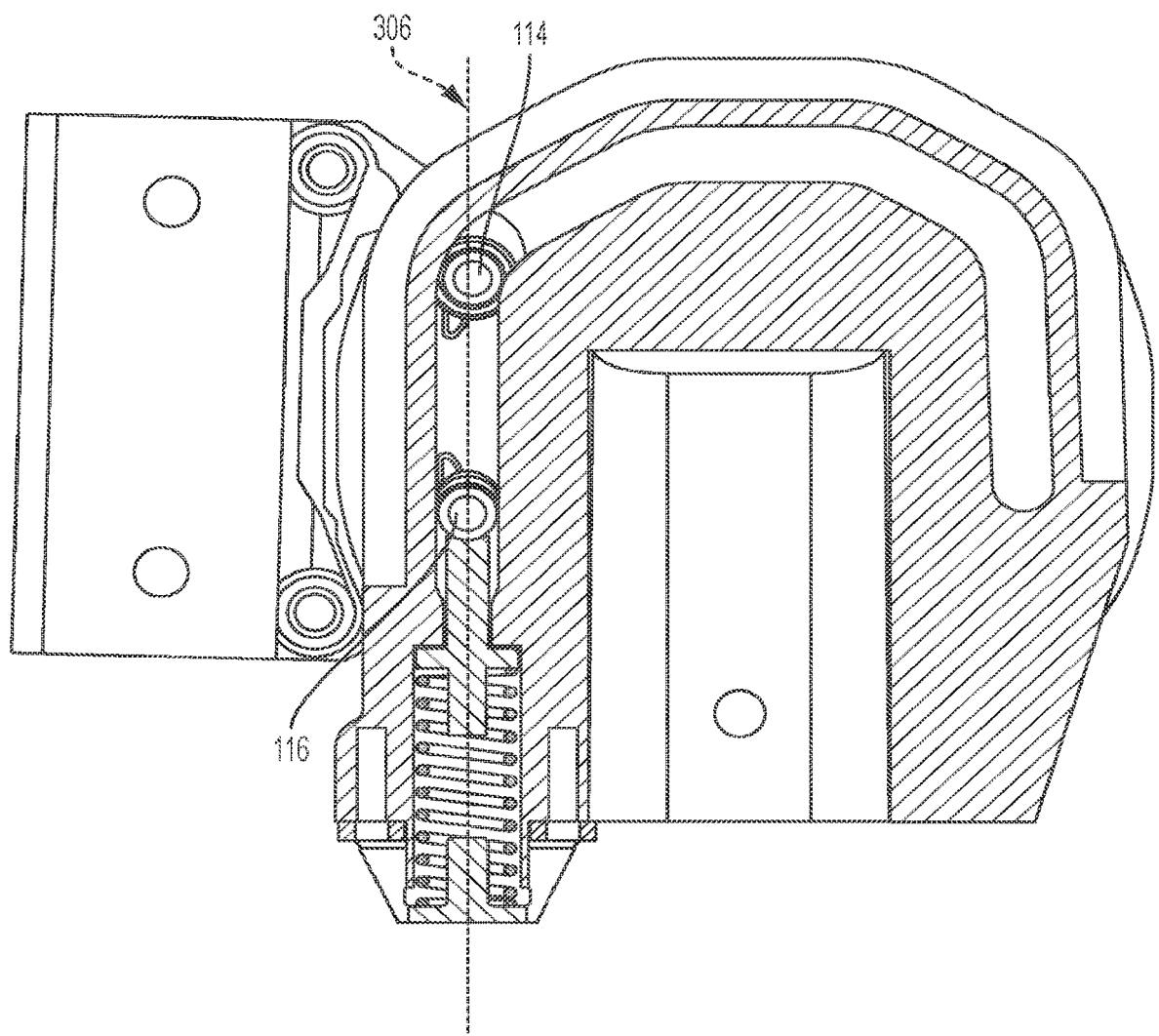

It is to be appreciated that the track 106 may be constructed to include elements that increase the ease of longitudinal portion 112 going through translational movements. FIG. 3a-3b are schematic diagrams illustrating an exemplary embodiment of a track 300 comprising a spring device operable to exert a translational force on the connectors 114 and 116 of the longitudinal portion 112. The track 300 may include a body 302 and a slot 304 defined in the body 302. The slot 304 may have a plurality of translational axes, including a first translational axis 306 defined by a first portion of the slot 304. The track 300 may further include a spring device 308 connected to the body 302. In an embodiment, a first end coil portion 310 of the spring device 308 is connected to the body and a second end coil portion 312 of the spring device 308 is operable to exert a force, either directly or indirectly, on the longitudinal portion 112, and wherein the force is in a direction substantially along the first translational axis 306. It is to be appreciated that the spring device 308 may be configured in a variety of ways in accordance with the present disclosure.

In the illustrated embodiment, the spring device 308 is seated in a cavity 314 adjacent to the first portion of the slot 304, and when the at least two connectors 114 and 116 are in the first portion of the slot 304, the spring device 308 is operable to apply a translational force on one of the at least two connectors 114 and 116, thereby contributing to a translational movement of the at the least two connectors 114 and 116 along the first translation axis 306 to the positions shown in FIG. 3b. As such, even if the longitudinal portion 112 may bear extensive weight, the force contributed by the spring device 308 in additional to any manually applied force allows for easier translation of the longitudinal portion 112 along the axis 306.

In an exemplary embodiment, the spring device 308 may include an end plate 316 connected to the second end coil portion 312 of the spring device 308 and the end plate may have an extender 318 extending from the cavity 314 into the first portion of the slot 304. The extender 318 may be configured to exert the translational force on the connector 116 directly. In some embodiments, the spring device may not include the pend plate 316 and extender 318.

Figure 6:
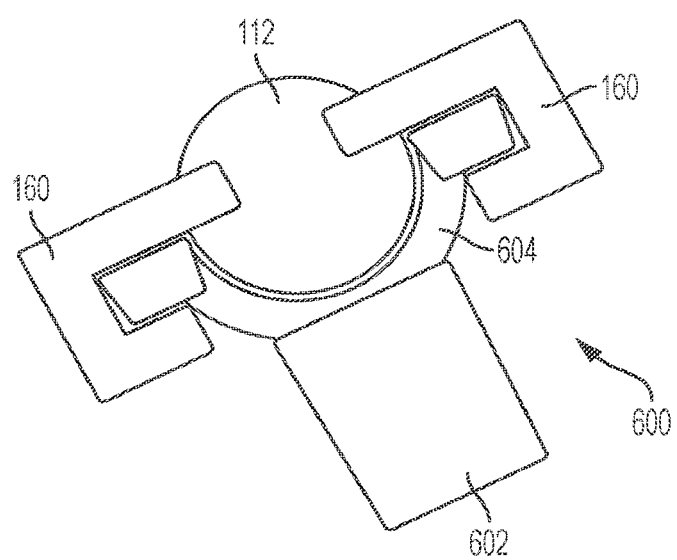

Turning now to FIG. 6 is a cross-sectional view of an exemplary track 600 and longitudinal portion 112 of the invertible structure of FIG. 1a. The track 600 comprises a body 602 and a rail portion 604 extending away from the body 602, and the connector element of the longitudinal portion 112 comprises a rail guide 160 slidably engaged with the rail portion 604 of the track 600. The operation of the track 600 and movement of the longitudinal portion 112 may be the same as discussed above.

FIGS. 4a and 4b are cross-sectional views of an exemplary embodiment of the stand 400 that may be included in the invertible structure 100 shown in FIG. 1. Referring to FIGS. 1 and 4a-4b, when the longitudinal portion 112 of the invertible structure 100 is in the substantially upright position, an end portion 130 of the longitudinal portion 112 may be received in the stand 400 to lock the longitudinal portion 112 in the substantially upright position. The stand 400 may include a releasable mechanism 402 for receiving the end portion 130. In an embodiment, the releasable mechanism 402 may include a stand slot 404 defined in the stand 400 for receiving the end portion 130 of the longitudinal portion 112 and a spring device 406 seated in a cavity 408 adjacent to the stand slot 404. The spring device 406 is operable to exert an upward force, either directly or indirectly, on the end portion 130 of the longitudinal portion 112 when received in the stand slot 404.

The spring device 406 may include a spring 410 and an end plate 412 connected to an end coil portion 414 of the spring 410. The end plate 412 may be disposed in the cavity 408 adjacent to the stand slot 404 and operable to be driven upwardly by the spring 410 to exert the upward force on the end portion 130 of the longitudinal portion 112. As such, even if the longitudinal portion 112 may bear extensive weight, the force contributed by the spring device 406 in additional to any manually applied force allows for easier translation of the longitudinal portion 112 when as the longitudinal portion 112 is to be inverted.

In an embodiment, releasable mechanism 402 may further comprises a lever 420 pivoted to the stand 400, in which the lever 420 may have a first end 422 that is depressible and a second end 424 that is operable to provide an additional upward force on the end plate 412 when the first end 422 of the lever 420 is depressed as shown in FIG. 4b. Such a lever allows for a user to use foot action to easily exert a large amount of additional upward force on the end plate 412 to translate the longitudinal portion 112 upwardly.

Figure 5:
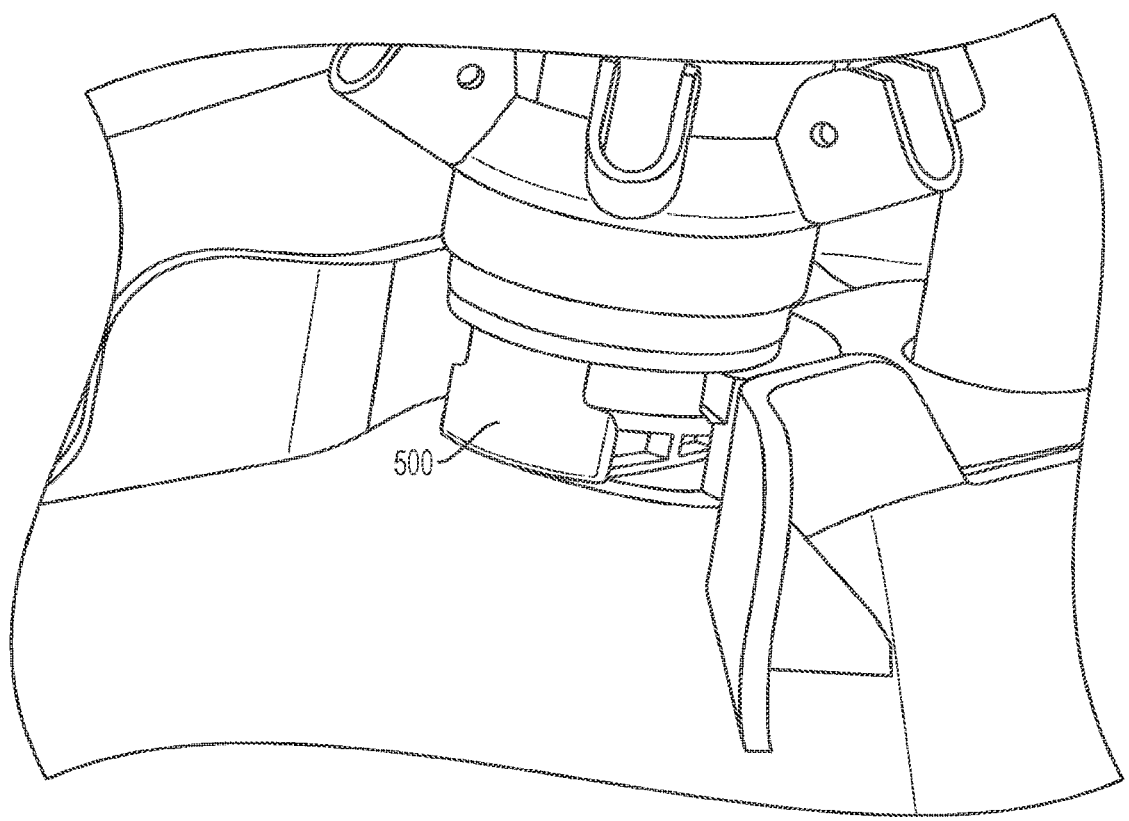
FIG. 5 is a perspective, focused view of an exemplary latch in the stand of FIGS. 4a-4b.

In an embodiment, releasable mechanism 402 may further comprises a lever 420 pivoted to the stand 400, in which the lever 420 may be deflected by compression, or other method of deflecting if the load on it is too large. To those skilled in the art, it is to be appreciated that this could be done by having a compressible portion or a defined flexing portion of the lever itself or by altering the lever pivot point thereby changing the lift capability of a rigid lever. In an embodiment, should the large upward force be beyond the force of a single section of the longitudinal portion, then the lever may compress or otherwise change shape such that the lever force translated would not lift the now excessive weight of multiple longitudinal sections, but would work again once the additional longitudinal sections were removed Another element that may be incorporated into the release mechanism 402 is a latch for locking the longitudinal portion 112 in place and preventing accidental inversion of the longitudinal portion 112. The release mechanism 402 may include a locking mechanism 500 moveable between a lock position and an unlock position. When the locking mechanism may be a latch 500 in an embodiment. As illustrated, the latch 500 is in the lock position as shown in FIGS. 4a, 4b, and 5, a portion 502 of the latch 500 is disposed in an upward path of the end plate 412 of the spring device 406, thereby preventing the end plate 412 from being driven upwardly by the spring 406 and/or lever 420 to exert the upward force on the end portion 130 of the longitudinal portion 112. In an embodiment the locking mechanism 500 in a locked position may be configured to also keep the longitudinal portion 112 from falling back into the stand slot 404 once it has been released. As such, the longitudinal portion may be reoriented along the track 106 without keeping the lever 420 deflected.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An invertible structure, comprising:
    a stand comprising a releasable mechanism;
    a support portion connected to the stand and extending upwardly from the stand;
    a track connected to the support portion, the track comprising a slot having a plurality of translational axes; and
    a longitudinal portion comprising:
        a plurality of support structures adapted to receive attachments; and
        a connector element for engaging the track, the connector element of the longitudinal portion comprising at least two connectors disposed at least partially in the slot and operable to be translated along the translational axes of the slot such that the longitudinal portion is re-orientated from a substantially upright orientation to a substantially inverted orientation or from a substantially inverted orientation to a substantially upright orientation,
    wherein the releasable mechanism is operable to receive an end portion of the longitudinal portion when in the substantially upright orientation.

2. The invertible structure of claim 1, wherein the slot of the track has a first translational axis defined by a first portion of the slot.

3. The invertible structure of claim 2, wherein the at least two connectors of the longitudinal portion are operable to translate along the first translational axis while the longitudinal portion is in a substantially upright orientation.

4. The invertible structure of claim 2, wherein the slot of the track has a second translational axis defined by a second portion of the slot.

5. The invertible structure of claim 4, wherein the first and second translational axes are substantially parallel.

6. The invertible structure of the claim 4, wherein the at least two connectors of the longitudinal portion are operable to substantially align along the second translational axis while the longitudinal portion is in a substantially inverted orientation.

7. The invertible structure of claim 1, wherein the releasable mechanism comprises:
   a stand slot defined in the stand for receiving the end portion of the longitudinal portion; and
   a spring device seated in a cavity adjacent to the stand slot,
   wherein the spring device is operable to exert an upward force, either directly or indirectly, on the end portion of the longitudinal portion when received in the stand slot.

8. The invertible structure of claim 7, wherein the releasable mechanism comprises a lever pivoted to the stand, the lever having a first end that is depressible and a second end that is operable to provide an outward force, either directly or indirectly, on the end portion of the longitudinal portion when received in the stand slot when the first end of the lever is depressed.

9. The invertible structure of claim 1, wherein the track comprises:
   a body and the slot is defined in the body; and
   a spring device connected to the body,
   wherein a first end coil portion of the spring device is connected to the body and a second end coil portion of the spring device is operable to exert a force, either directly or indirectly, on the longitudinal portion, and wherein the force is in a direction substantially along a first translational axis of the slot.

10. The invertible structure of claim 9, wherein the spring device is seal first portion of the slot, and when the at least two connectors are in the first portion of the slot, the spring device is operable to apply a translational force on one of the at least two connectors, thereby contributing to a translational movement of the at the least two connectors along the first translational axis.

11. The invertible structure of claim 10, wherein the spring device comprises an end plate connected to the second end coil portion of the spring device, the end plate having an extender extending from a cavity, which is adjacent to the slot, into the first portion of the slot, the extender being configured to exert the translational force on the one of the at least two connectors.

12. An invertible structure, comprising:
   a stand comprising a releasable mechanism;
   a support portion connected to the stand and extending upwardly from the stand;
   a track connected to the support portion, the track having a plurality of translational axes; and
   a longitudinal portion comprising:
      a plurality of support structures operable to receive attachments; and
      a connector element comprising at least two connectors operable to be translated along the translational axes,
   wherein the at least two connectors of the longitudinal portion are operable to move along the track such that the longitudinal portion is re-orientated from a substantially upright orientation to a substantially inverted orientation or from a substantially inverted orientation to a substantially upright orientation,
   wherein the releasable mechanism is operable to receive an end portion of the longitudinal portion when in the substantially upright orientation.

13. The invertible structure of claim 12, wherein the releasable mechanism comprises:
   a stand slot defined in the stand for receiving the end portion of the longitudinal portion; and
   a spring device seated in a cavity adjacent to the stand slot,
   wherein the spring device is operable to exert an upward force, either directly or indirectly, on the end portion of the longitudinal portion when received in the stand slot.

14. The invertible structure of claim 13, wherein the releasable mechanism comprises a lever pivoted to the stand, the lever having a first end that is depressible and a second end that is operable to provide an outward force, either directly or indirectly, on the end portion of the longitudinal portion when received in the stand slot when the first end of the lever is depressed.

15. The invertible structure of claim 12, wherein the track comprises a body and a slot defined therein, the slot extending along the plurality of translational axes, and the at least two connectors are disposed at least partially in the slot and operable to be translated along the translational axes of the slot.

16. The invertible structure of claim 15, wherein the slot of the track has a first translational axis defined by a first portion of the slot,
   wherein the slot of the track has a second translational axis defined by a second portion of the slot, and
   wherein the slot of the track has third and fourth translational axes defined by third and fourth portions of the slot, the third and fourth translational axes being oblique to each other and being oblique to the first and second translational axes of the slot.

17. The invertible structure of claim 16, wherein the at least two connectors of the longitudinal portion are configured to rest along different translational axes when only gravitational force is applied on the longitudinal portion thereby resulting in the longitudinal portion being rested in an oblique orientation.

18. The invertible structure of claim 16, wherein the at least two connectors of the longitudinal portion are operable to rest along different translational axes when only gravitational force is applied on the longitudinal portion thereby resulting in the longitudinal portion being rested in a substantially perpendicular orientation.

19. The invertible structure of claim 16, wherein the first and second translational axes are substantially parallel.

20. The invertible structure of claim 12, wherein the track comprises:
   a body having a slot is defined in the body; and
   a spring device connected to the body,
   wherein a first end coil portion of the spring device is connected to the body and a second end coil portion of the spring device is operable to exert a force, either directly or indirectly, on the longitudinal portion, and wherein the force is in a direction substantially along a first translational axis of the slot.

\* \* \* \* \*